United States Patent [19]

Smith, Jr. et al.

[11] 4,398,986
[45] Aug. 16, 1983

[54] BINDING METHOD

[75] Inventors: Robert C. Smith, Jr.; James A. McGlen, both of Rochester, N.Y.

[73] Assignee: Eastman Kodak Company, Rochester, N.Y.

[21] Appl. No.: 376,357

[22] Filed: May 10, 1982

Related U.S. Application Data

[62] Division of Ser. No. 13,869, Feb. 22, 1979, Pat. No. 4,343,673.

[51] Int. Cl.³ ............................................. B32B 31/00
[52] U.S. Cl. .................................... 156/290; 156/291; 156/558; 156/559; 156/560; 156/580; 156/583.1; 156/583.4
[58] Field of Search ............... 156/583.1, 583.4, 290, 156/182, 308.4, 309.6, 558, 559, 560, 563, 291; 11/1 B; 270/58

[56] References Cited

U.S. PATENT DOCUMENTS

| | | | |
|---|---|---|---|
| 3,258,385 | 6/1966 | Lake | 156/581 |
| 3,793,016 | 2/1974 | Eichorn | 156/291 |
| 3,794,550 | 2/1974 | Taillie | 156/291 |
| 3,933,571 | 1/1976 | Studen | 156/583.1 |
| 4,063,983 | 12/1977 | Shiverdecker | 156/583.1 |
| 4,070,513 | 1/1978 | Rhoads | 156/290 |

*Primary Examiner*—Edward C. Kimlin
*Assistant Examiner*—Timothy W. Heitbrink
*Attorney, Agent, or Firm*—G. Herman Childress

[57] ABSTRACT

Copy sheets having a re-fusable xerographic toner along an edge thereof are bound into booklets by arranging the sheets in a stack and re-fusing the toner so that the re-fused toner adheres adjacent sheets together. The re-fusing operation can be accomplished after each group of a few sheets is received from a copier so that the finisher operation can be carried on at the same rate copies are produced by the copier. Alternately, a larger stack of sheets can be bound together in an off-line basis by a simple heating step.

1 Claim, 4 Drawing Figures

BINDING METHOD

This is a division of application Ser. No. 13,869 filed Feb. 22, 1979 now U.S. Pat. No. 4,343,673.

FIELD OF THE INVENTION

This invention relates to a binding method. More specifically, the invention relates to a binding method wherein a thermoplastic toner fused to sheets in a copier is re-fused to secure the sheets together.

DESCRIPTION OF THE PRIOR ART

U.S. Pat. Nos. 3,793,016 and 3,794,550 disclose xerographic copiers wherein a pattern of toner is applied along an edge portion of each of a plurality of copy sheets and fused to the copy sheets as the copies are made. Then the sheets are arranged so that the pattern of toner is overlapping on adjacent sheets, and the toner is heated to re-fuse the toner, thereby to bind the adjacent sheets together. These patents disclose both on-line binding apparatus and off-line binding apparatus wherein re-fusing of toner secures the sheets together.

Some difficulties may be encountered in practicing the sheet binding process described in the referenced patents. More specifically, the time required by that process to transfer sufficient heat through a thick stack of copy sheets to effect re-fusing of the toner for bonding may be so long as to make it impractical to carry out on-line binding of thick stacks of copy sheets, especially with high-speed copier/duplicator apparatus. Off-line binding of thick stacks is possible by allowing long time periods for re-fusing of toner; however, it clearly is advantageous to provide apparatus for accomplishing on-line binding at the rate the copies are produced by relatively high speed copier/duplicator machines.

Another disadvantage of the binding apparatus and method disclosed in the beforementioned patents is that all of the toner that is to be re-fused to effect binding is heated simultaneously. Thus all of it is re-fused each time the toner heaters effect binding. If additional sheets are to be added to a bound stack and the sheets are re-heated again, some of the toner must be re-fused a second time in order to adhere the new sheets to the stack. Such re-fusing may adversely effect the bonding strength between those sheets that are bound by the toner that was re-fused twice.

It is also known in the art to provide patterned heating shoes or bars for various purposes. Such patterned bars are disclosed, for example, in U.S. Pat. Nos. 3,258,385 and 4,070,513. Typically patterned heating bars such as disclosed in those patents are used for applying a pattern of heat to seal film or the like only once, that is, the patterned bar is not moved into engagement with the joint to be sealed more than once.

SUMMARY OF THE INVENTION

In accordance with the present invention, a binding method is provided for securing together a plurality of sheets having a heat-sealable adhesive (such as re-fusable toner) between adjacent surfaces of the sheets.

The method includes the steps of supporting a first group of unattached sheets in overlapping relation with the material located between adjacent sheets and in contact with at least one of each two adjacent sheets. Then a first portion of the material between the sheets is heated to a temperature sufficient to effect bonding of the material to the sheets, thereby securing together adjacent sheets in the first group of sheets. A second group of unattached sheets is placed over the first group of sheets with the material located between adjacent sheets of the second group and in contact with one sheet of the first group. A first portion of the material between sheets of the second group and between the second group and one sheet of the first group is heated to a temperature sufficient to effect bonding of the material to the sheets, thereby securing together adjacent sheets in the second group and first and second groups of sheets. The first portion of the material of the second group of sheets is offset from the first portion of the material in the first group of sheets so that heat transferred through the second group of sheets to the first group of sheets will be primarily in an area outside of the first portion of the material in the first group.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
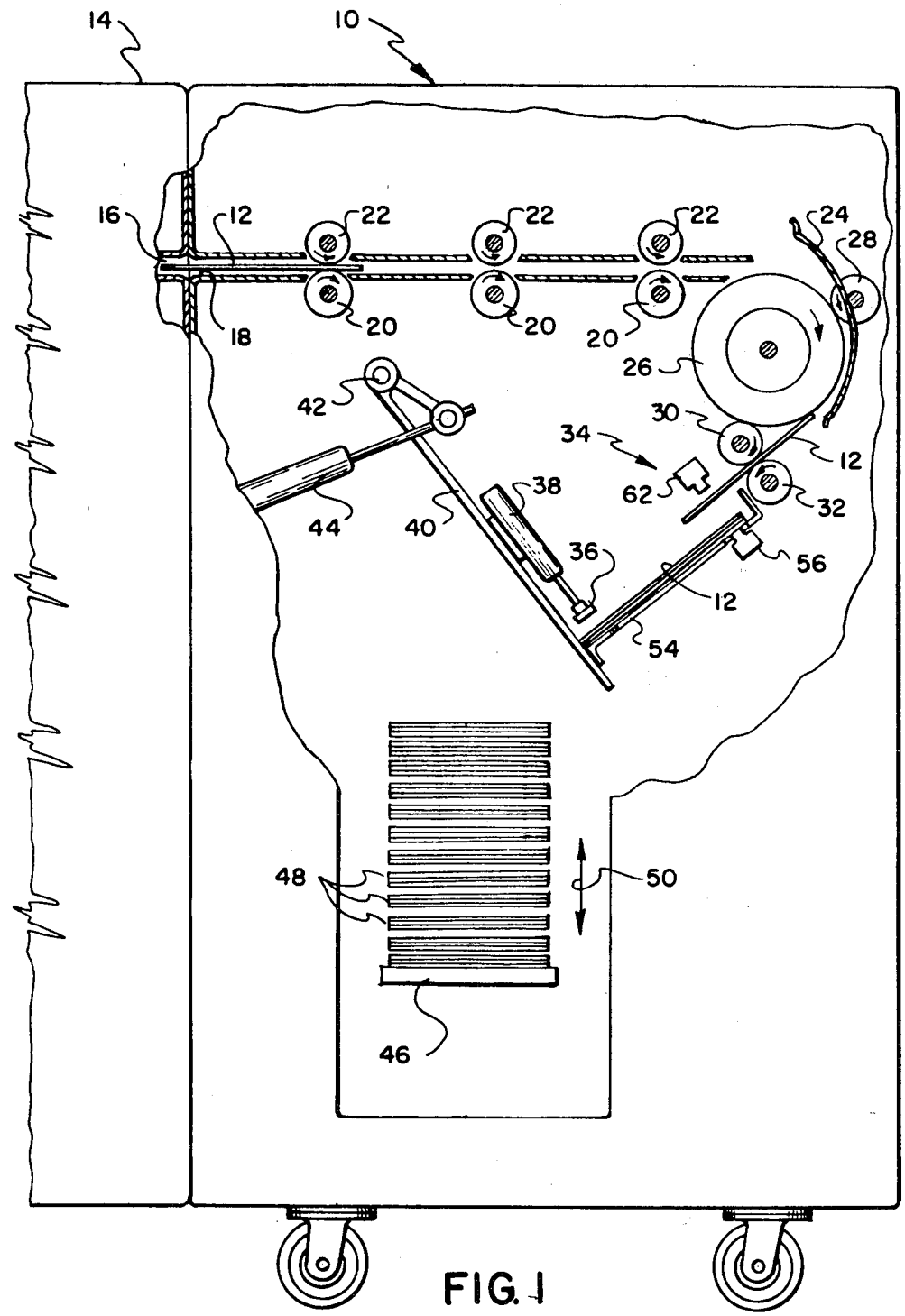
FIG. 1 is a fragmentary elevation view, partially broken away, illustrating a finisher for copy sheets received from a copier/duplicator or the like, the finisher incorporating binding apparatus suitable for carrying out the method of the present invention.

Because finishing methods are well known, the present description will be directed in particular to those steps forming part of the binding method of the present invention. Elements of the method steps not specifically disclosed or described can be selected from those known in the art.

Apparatus for carrying out the binding method of the present invention is shown incorporated in a finisher generally designated 10 which receives copy sheets 12 seriatim from a copier/duplicator 14. The copy sheets are delivered to the finisher through aligned openings or guide slots 16 and 18 in the copier and finisher, respectively. When the sheets 12 have information copied on only one side thereof (i.e., simplex copies), the copied information is on the lower face of the sheet as the sheet travels through slots 16, 18. When the sheets are duplex copies (i.e., they have information copied on both faces) then ordinarily the odd numbered pages face downwardly in slots 16, 18.

The copy sheets are advanced toward the binding apparatus by a plurality of pairs of driven rollers 20 and idler rollers 22. The copy sheets then engage a curved guide 24 which initially deflects the copy sheets into the nip between a drive roller 26 and an idler roller 28. The guide 24 and rollers 26, 28 turn the copy sheet over so that the side of the sheet which was facing downwardly in the guide slots 16 and 18 faces generally upwardly as it leaves the roller 26 and guide 24.

The guide 24 directs the sheet into the nip of a pair of rollers 30 and 32 which drive the sheets into the binding apparatus generally designated 34. After the binding apparatus has secured together a stack of copy sheets, the resultant booklet is gripped by a clamp 36 operated by a pneumatic cylinder 38. The clamp and cylinder are supported on an arm 40 which is movable about a pivot 42 by another pneumatic cylinder 44 to bring the completed booklet into a position over a tray 46 where the booklet is released. The tray supports a plurality of completed booklets 48, and the tray is mounted on an elevator for movement in an up and down direction as indicated by the arrows 50 so that an entire stack of the booklets can be accumulated on the tray for removal. Except for the binding apparatus 34, the apparatus shown in FIG. 1 is similar to that embodied in an earlier Copier/Duplicator and Finisher manufactured by the assignee of the present invention. The earlier finisher has stitching apparatus for stapling stacks of sheets together in booklet form. It will be understood that the binding apparatus 34 of the present invention can be used in lieu of such stitching apparatus or in addition to that apparatus so that the user of the equipment has a choice of either stapling or binding by re-fusing of toner as disclosed hereinafter.

The adhesive material used for binding sheets together can comprise any suitable heat sealable adhesive, such as a thermoplastic adhesive, and preferably comprises a cross-linked toner composition. A cross-linked toner suitable for use in binding sheets by the apparatus and method described herein is disclosed in the commonly assigned U.S. Pat. No. 3,938,992 which issued on Feb. 17, 1976 in the names of Jadwin et al.

Figure 3:
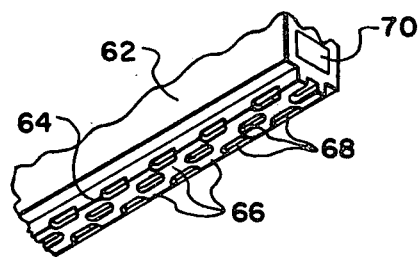
FIG. 3 is an exploded view illustrating portions of the binding apparatus and a booklet being formed by the method of the invention.
Figure 3:
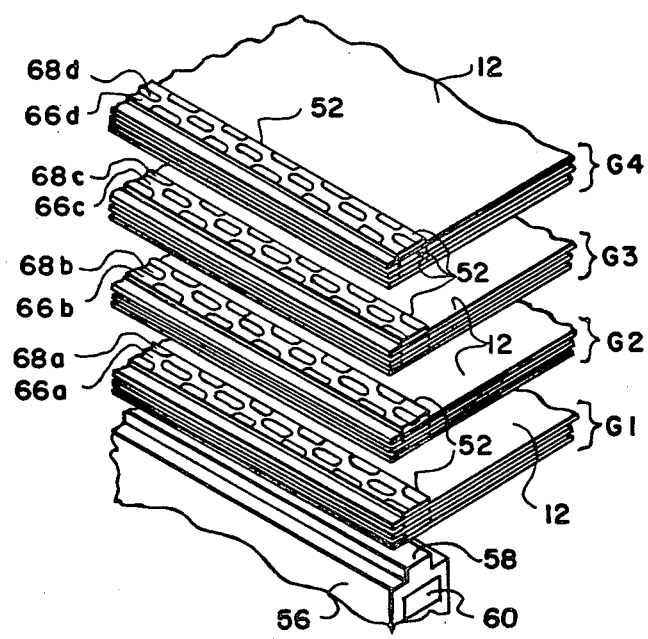

As sheets 12 pass through the copier image-wise distributions of toner particles are applied to the sheets, and then fused to the sheets in order to provide an image of the original document onto the copy sheets in the usual manner. Copy sheets furnished to the binding apparatus also are provided with a pattern of toner located in an area where it can be used in binding adjacent sheets together. Preferably, the pattern and area comprise a stripe of toner 52 located adjacent and parallel to a side edge of the copy sheets as illustrated in FIG. 3. Copy sheets are delivered to the binding apparatus 34 and received in a tray 54 which receives the copy sheets and holds the stack of such sheets with the toner areas 52 of the sheets substantially aligned throughout the stack of sheets in the tray.

Located beneath the tray 54 and in alignment with the portion of the sheets 12 having the toner stripe 52 thereon, is a heating shoe 56 that has a smooth, bar-like surface 58. As explained later, heat is transferred from the shoe to the stripe 52 on sheets 12. A heating element 60 in the shoe transfers heat to the surface 58. Surface 58 is located immediately beneath the tray 54, and is aligned with the toner stripe 52 on each of the sheets. Shoe 56 can extend along the upper edge of tray 54 or it can project through a slot in the tray.

The heating shoe 56 is stationary and forms a back-up member for a movable heating bar 62. Bar 62 preferably has an elongate surface 64 with a pattern thereon comprising raised portions 66 and recessed portions 68. Heat is transmitted from the raised portions 66 to the toner stripes or areas 52. The recessed portions 68 are located below the level of the raised portions 66 on surface 64, and the area of the raised portions is substantially equal to the area of the recessed portions. Also, as illustrated in FIG. 3, the raised and recessed portions are alternately arranged along the surface 64 in a repeating pattern that extends substantially the entire length of the bar 62. The particular pattern shown in FIG. 3 comprises three rows of elongate recesses 68, each recess in a row being spaced from the adjacent recesses in that row by a raised portion that extends a distance substantially equal to the length of one of the recesses. Alternate rows of the recesses are offset or staggered so that the first and third rows of the recesses are substantially aligned and the row therebetween is offset from the first and third rows by the length of a recess 68. The first and third rows are separated by a distance equal to the width of a recess. Surface 64 can be about $\frac{1}{4}''$ wide, and each recess 68 can be on the order of $\frac{1}{4}''$ in length, for example. Raised portions 66 of the heating bar are heated by means of a heating element 70 located in the heating bar. Heating elements 60 and 70 can be of any suitable type, such as electrical resistance heating elements.

When sheets have been furnished to the tray 54 relative movement is effected between the heating shoe 58 and the patterned surface 64 of the heating bar 62, thereby to bring the shoe and bar into engagement with the sheets 12 on opposite sides of the stripes or areas 52 with sufficient force to compress the sheets. The heat and pressure thus applied to the toner stripes refuses a portion of the toner, thereby causing it to adhere not only to the sheet on which it was originally fused but also to the adjacent sheet contacted by the toner stripe. For example, a toner stripe initially fused to the upper surface of a lower sheet is also adhered to the bottom surface of the adjacent sheet above the toner stripe.

Figure 2:
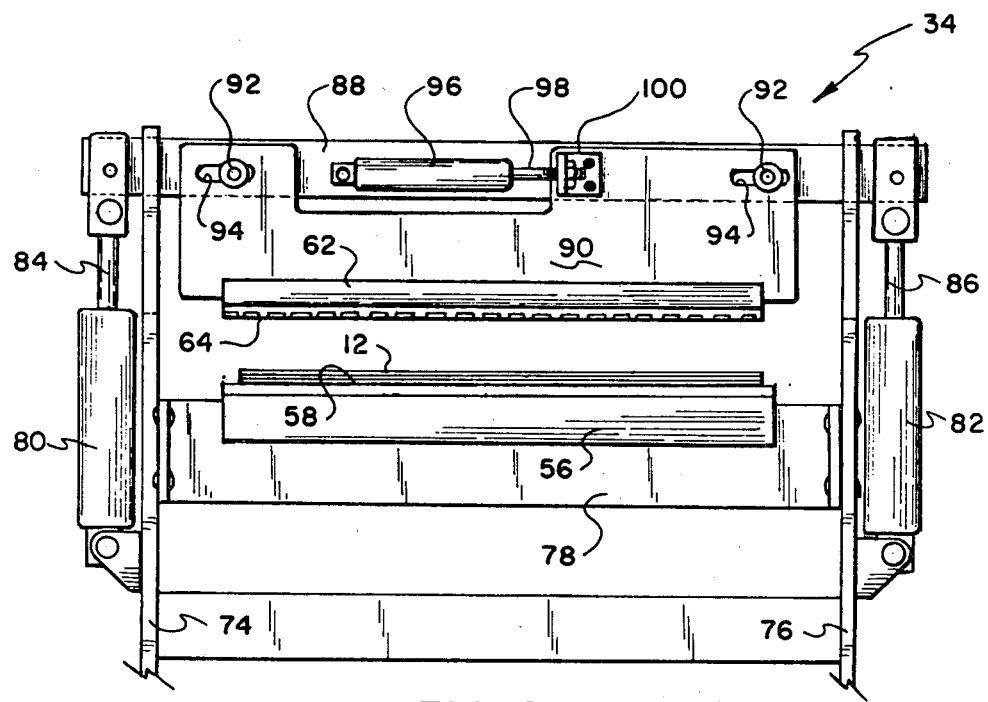
FIG. 2 is an enlarged detail view of the binding apparatus per se.
Figure 4:
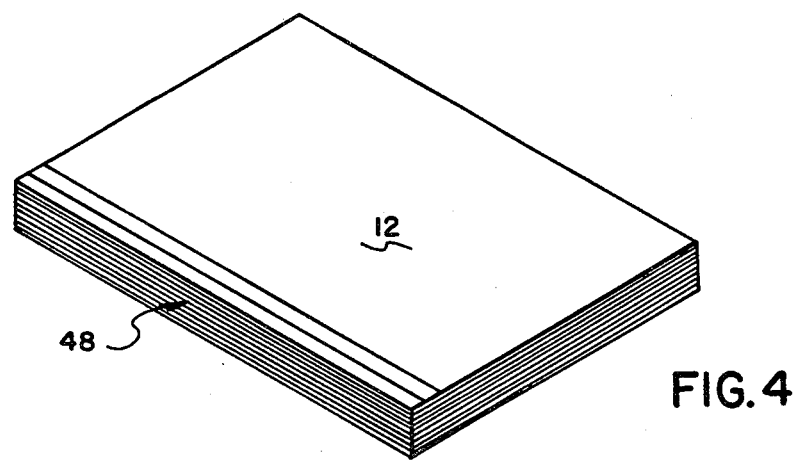
FIG. 4 is a perspective view of a booklet formed by the binding method of the invention.

FIG. 2 illustrates apparatus for mounting the heating shoe 56 and the heating bar 62, and for moving the heating bar relative to the heating shoe. Finisher 10 has a pair of spaced frame members 74 and 76. A plate 78 has end flanges that are secured to the frame members. The heating shoe 56 is rigidly secured to the plate, thereby fixedly mounting the heating shoe in position.

A pneumatic cylinder 80 is secured to frame member 74, and a similar cylinder 82 is secured to the frame member 76. The cylinders have rods 84 and 86, respectively, which are extended and retracted in a conventional manner. Rods 84 and 86 are connected to the ends of a plate 88. A plate 90 is secured to plate 88 by bolts 92 which extend through elongate slots 94 in plate 90 and into the plate 88, thereby providing for lateral (left or right) movement of mounting plate 90 relative to plate 88. The heating bar 62 is fixed to the plate 90 and located with respect to shoe 56 so that extension and retraction of the rods 84 and 86 upon operation of cylinders 80 and 82 effects movement of the bar 62 toward and away from the heating shoe 56. Lateral movement of plate 90, and thus the heating bar, is achieved by a third pneumatic cylinder 96 which has an extensible rod 98 connected by means of a coupling 100 to the plate 90. Cylinder 96 is mounted on plate 88 and the axis of the cylinder and rod 98 are aligned with the slots 94 so that extension and retraction of rod 98 effects lateral movement of plate 90 with respect to the plate 88. In this manner the position of the heating bar 62 can be shifted longitudinally, that is, in the direction of the rows of raised and recessed areas forming the pattern on surface 64 of the heating bar. As is apparent from the following description of the operation of the apparatus, bar 62 travels in a generally U-shaped path as it repetitively moves into and out of engagement with sheets between the bar and shoe 56.

The binding apparatus is controlled by suitable means (not shown), such as from the computer that also controls operation of the associated copying apparatus 14. The following description initially details the on-line binding method of the invention; that is, the document sheets delivered to tray 54 are directly from the copier and at the same rate they are produced by the copier. In this method the binding apparatus is required to bind sheets together at the same rate as they are produced by operation of the copier. In order to bind numerous copies produced at the high production rates common with modern copier/duplicators, the binding apparatus preferably cycles to bind sheets together after each group of a few sheets is fed to the apparatus, and additional sheets are bound to each other, and to previously bound sheets after each group of a few sheets is received from the copier. By way of example, the following description of the operation of the apparatus describes the binding apparatus cycling after delivery of each group of three copy sheets, and describes the formation of a booklet comprising four groups of the sheets as shown at G1–G4 in FIG. 3. Very little time is required for binding sheets together in small groups, such as groups of three sheets, because the length of time required for the heat to penetrate the sheets to re-fuse the toner to effect bonding is directly related to the number and thickness of the stack of sheets.

Prior to operation of the finisher the heating elements 60 and 70 are turned on to heat surface 58 of shoe 56 and surface 64 of bar 62. When copier 14 is operated, sheets are delivered to the tray 54 seriatim from the copier along the paths 16, 18 and through the nip formed by rollers 30 and 32. After the first group G1 of three sheets is in position in tray 54, the cylinders 80 and 82 are activated to retract the associated rods 84 and 86, respectively, thereby moving the bar 62 toward the shoe 56 until the sheets therebetween are compressed. Heat is transferred from the bar and shoe through the toner stripes 52 located therebetween. Heat is transferred through surface 58 of the heating shoe along substantially the full length and width of the toner stripe. However, heat is transferred from the bar 62 primarily through the raised portion 66 of surface 64 so that re-fusing of the toner stripe on at least the top sheet of the first group G1 of three sheets is primarily in the area immediately beneath the raised portion 66, such re-fused portions being designated 66a in FIG. 3. Thus the toner portion 66a on the upper most sheet has been re-fused once whereas the remaining toner portion 68a, which lies beneath the recesses 68, remains substantially unre-fused.

After cylinders 80, 82 are operated to separate bar 62 from the first group of sheets G1, an additional group G2 of three sheets is delivered to tray 54 on top of the first group of sheets G1. Before the second group of three sheets is re-fused or bound together the cylinder 96 is operated to move the rod 98, thereby shifting the plate 90 and the heating bar 62 by a distance substantially equal to the spacing between two longitudinally adjacent recessed portions in the pattern on the surface 64. Then cylinders 80 and 82 are again operated to bring the heating bar toward shoe 56 to compress the second group G2 of three sheets against the first group G1 of three sheets. Again, heat is transferred through the patterned surface 64 on bar 62 and from surface 58 of shoe 56 to both the first and second groups of sheets. During this second heating cycle the raised portions 66 on the heating bar directly overlie the previously unre-fused portion 68a on the first group G1 of three sheets so that the portion of the toner designated 68a is re-fused for the first time to bond the top sheet of the first group G1 of three sheets to the bottom surface of the bottommost sheet in the second group G2 of three sheets. At the same time, there is another pattern of re-fused and unre-fused toner areas formed on the second group of sheets, such being shown as 66b and 68b respectively. Due to the shifting of the heating bar in a lateral direction parallel to its length as previously explained, all sheets of the first two groups have been adhered together by toner which has been re-fused only once, including the top most sheet of the first group G1 of three sheets and the bottommost sheet of the second group G2 of three sheets.

Similarly, cylinders 80 and 82 are again operated to separate the heating bar from the stack of sheets, the cylinder 96 is operated to shift the heating bar laterally and, after another group G3 of three sheets have been delivered to the tray on top of the second group of three sheets, the cylinders 80 and 82 again drive the heating bar toward shoe 56 so that the bar engages the top one of the sheets in the group G3 of sheets. At this time the pattern on surface 64 of the heating bar is located in the same relative position as it was when it engaged the first group of three sheets so that it again forms a pattern of re-fused and unre-fused toner stripe portions designated 66c and 68c, respectively. Likewise the fourth group G4 of three sheets shown in FIG. 3 is bonded to each other and to the third group of sheets after the heating bar 62 has again been shifted laterally so that the re-fused portions 66d on the fourth set of sheets directly overlie the re-fused portion 66c. This process continues until all of the copy sheets for a complete booklet have been bonded together.

By bonding sheets together in groups of only a few sheets at a time, the cycle time required for heating the toner stripes sufficiently to effect re-fusing and thus bonding together of sheets is quite short. At the same time, a thick booklet can be formed in this manner while the finishing apparatus continues to operate on an on-line basis and without changing the cycle time of the associated copier. Because the heating bar is oscillated laterally back and forth in the manner described, each sheet is adhered to the adjacent sheet with "fresh" toner (toner which has been fused only once to the sheet of paper) rather than with toner which has been previously re-fused at least once. In this manner an improved bond is obtained, and this also permits the booklet to be built up in sets of only a few sheets in order to obtain booklets of substantial numbers of sheets.

The method of the invention also can be practiced on an off-line basis by simple placing stacks of sheets to be bonded together in the tray 54 and energizing the cylinders 80 and 82 to bring the bar 62 toward shoe 56 where it can remain in place until sufficient heat is transferred through an entire stack of sheets in order to bind all the sheets together. Thus booklets of ten, twenty-five or more sheets can be adhered together in a single cycle of operation. However, the time required for transfer of heat through a relatively thick booklet of this type is more than is normally available for on-line operation with high speed copier/duplicators.

The operating temperatures, pressures, time cycles and other parameters used will depend on a number of factors, including the chemical composition of the particular toner or other adhesive used, the number of sheets in a group of sheets G being bound together by the on-line method or the total number of sheets being bound together by the off-line method, the thickness and type of paper used, etc. By way of example, and assuming the use of a toner composition as described in U.S. Pat. No. 3,938,992, the heating bars 60 and 70 can be heated to approximately 350 to 370 degrees Fahrenheit with the preferred temperature being 360 degrees Fahrenheit. Air cylinders 80 and 82 receive air under sufficient pressure to exert a pressure of about 40 psi against the groups of sheets G1–G4.

When the apparatus is used on-line with a copier/duplicator such as the earlier Copiers/Duplicators manufactured by the assignee of the present invention (which produces copies at the rate of 4200 copies per hour) and when booklets are being formed in groups of three sheets, as explained hereinbefore, the total cycle time is approximately 1.1 second plus or minus two-tenths of a second. Of course, longer cycle times can be used when the copier production rate is lower and shorter cycle times are required for higher production rates. With respect to the off-line mode of operation, and assuming an operating temperature range of 350 to 370 degrees Fahrenheit and pressure exerted on the paper of about 40 psi, the preferred time cycle for a stack of 10 sheets of paper in a group is fifteen seconds. Twenty-five sheets of paper will require approximately 30 seconds of time, and fifty sheets of papers will require approximately 90 seconds of time. These cycle times for the off-line mode of operation are the times required for binding all sheets together in a single bonding step in which the heating shoes remain in contact with the stack of sheets until all of the sheets are bound together.

The toner stripes 52 have been shown on the upper surface only of each copy sheet 12. However, if desired the stripe also can be applied to the lower surface only or to both surfaces of a copy sheet. If duplex copies are being received from the copier, then stripes 52 can be applied to both surfaces or alternate sheets. When the upper and/or lower sheet of a booklet is a cover sheet that has not received a toned image in the copier, then the cover sheets can be adhered to the copy sheets with stripes of toner on those copy sheets adjacent to the cover sheets.

While the binding apparatus is engaged with sheets to effect re-fusing of toner, the delivery of subsequent sheets can be delayed by the sheet feeding rollers of the finisher. Apparatus for effecting delayed delivery of sheets is embodied in the previously-mentioned finisher.

The binding method of the invention has been described in connection with the operation of the binding apparatus; however, it will be apparent that the method steps can be carried out with other types of apparatus.

The invention has been described in detail with particular reference to preferred embodiments thereof, but it will be understood that variations and modifications can be effected within the spirit and scope of the invention.

We claim:

1. A method for securing together a plurality of sheets having a heat-sealable material positioned on adjacent surfaces of the sheets, the method comprising the steps of:

supporting a first group of unattached sheets in overlapping relation with the material located between adjacent sheets and in contact with at least one of each two adjacent sheets;

selectively heating a first portion of the material between the sheets to a temperature sufficient to effect bonding of the material to the sheets, thereby securing together adjacent sheets in the first group of sheets;

placing over the first group of sheets a second group of unattached sheets with said material located between adjacent sheets of the second group and in contact with one sheet of the first group; and selectively heating a first portion of the material between sheets of the second group and between the second group and one sheet of the first group to a temperature sufficient to effect bonding of the material to the sheets, thereby securing together adjacent sheets in the second group and the first and second groups of sheets, the first portion of the material of the second group of sheets being offset from the first portion of the material in the first group of sheets so that heat transferred through the second group of sheets to the first group of sheets will be primarily in an area outside of the first portion of the material in the first group.

* * * * *